(12) United States Patent
Robinson

(10) Patent No.: US 6,284,168 B1
(45) Date of Patent: *Sep. 4, 2001

(54) METHOD OF FORMING MOLDS AND MOLD PLUGS

(76) Inventor: Gary Robinson, 4002 Highland Ave., Benton Harbor, MI (US) 49022

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,309

(22) Filed: Mar. 28, 1997

(51) Int. Cl.$^7$ .................................................. B29C 33/40
(52) U.S. Cl. .................... 264/40.1; 264/101; 264/130; 264/134; 264/162; 264/219; 264/220; 249/155; 249/157; 249/158; 249/167
(58) Field of Search ..................................... 264/220, 219, 264/40.1, 101, 162, 130, 134; 249/155, 157, 158, 167

(56) References Cited

U.S. PATENT DOCUMENTS

| | | |
|---|---|---|
| 3,072,971 | 1/1963 | Kish . |
| 3,596,869 * | 8/1971 | Humphrey ............................ 249/155 |
| 4,474,722 | 10/1984 | Martin . |
| 4,555,836 | 12/1985 | Martin . |
| 4,601,867 * | 7/1986 | Martell et al. ....................... 264/227 |
| 4,863,663 * | 9/1989 | Nico, Jr. et al. ...................... 264/130 |
| 4,946,552 | 8/1990 | Onnie . |
| 5,192,560 * | 3/1993 | Umetsu et al. ....................... 425/175 |

FOREIGN PATENT DOCUMENTS 63-214412    9/1988 (JP) .

OTHER PUBLICATIONS

Engineering News; Page unknown; Oct. 7, 1996.

* cited by examiner

Primary Examiner—Jill L. Heitbrink
Assistant Examiner—Suzanne E. McDowell
(74) Attorney, Agent, or Firm—Barnes & Thornburg

(57) ABSTRACT

A method of making a mold includes the steps of determining the contours of the part to be produced, forming pattern stations having a surface conforming to a contour of the part at a given location, placing the stations in spaced apart relationship, filling the spaces, vacuum forming a plastic material to a portion and applying a mold making material. An alternative method includes the steps of determining the contours of the part to be produced, forming pattern stations each having a surface conforming to a contour of the part at a given location, joining the stations together such that their surfaces form substantially the complete contour of the part and covering a portion of the pattern with a plastic material. The stations may be releasably joined together such that one or more may be removed and substituted with one or more different stations. Another method includes the steps of determining the contours of the part to be produced, cutting the contours at various locations in sheets of material, joining the sheets together to form a cavity corresponding to the contours of the part, vacuum forming a plastic material in the cavity, and applying a mold making material.

12 Claims, 8 Drawing Sheets

METHOD OF FORMING MOLDS AND MOLD PLUGS

BACKGROUND AND SUMMARY OF THE INVENTION

The present invention relates to molds and methods for making molds.

Numerous products are manufactured by molding. For relatively large products, such as certain components of recreational vehicles, a mold is typically made by creating a pattern and pulling the mold from the pattern.

It is known to produce patterns by assembling an assortment of wood, foam and metal scraps corresponding to the general shape of the part to be produced. Once this base has been formed, it is covered with an epoxy material and cut, sanded or otherwise shaped to form the pattern, The pattern is then smoothed. and ready for use. To form the mold, the pattern is covered with, a thermosetting plastic material that is allowed to harden. The mold is then pulled from the pattern and is ready for use.

There are several problems with this known method of making a pattern and a mold. First, the process is time consuming. Second, the final appearance of the part cannot be determined until the pattern is almost complete. Additionally, if at this late stage any changes are desired, they may be difficult and time consuming to make, involving cutting away entire portions of the pattern and rebuilding them from scratch.

A method of making a mold according to the present invention includes the steps of determining the contours of the part to be produced from the mold, forming a plurality of pattern stations each having a surface conforming at least in part to a contour of the part at a given location, placing the pattern stations in spaced apart relationship, filling the spaces between the pattern stations, vacuum forming a plastic material to a portion of the pattern and applying a mold making material. The stations may be angled relative to one another and may intersect. The stations may be made from wood, foam or other material. A release agent may be applied to the vacuum formed plastic material. Also, a gelcoat material may be applied and sanded. The gelcoat material may be waxed. One or more female pattern stations may be cut and positioned over the pattern stations to check for proper alignment. A metal sheet may be attached to the pattern stations prior to filling the spaces between the pattern stations.

According to another embodiment of the present invention, a method of making a mold includes the steps of determining the contours of the part to be produced from the mold, forming a plurality of pattern stations each having a surface conforming at least in part to a contour of the part at a given location, joining the pattern stations together such that their surfaces form substantially the complete contour of the part and covering a portion of the pattern with a plastic material. The pattern stations may be releasibly joined together such that one or more pattern stations may be removed and substituted with one or more different pattern stations. Plastic material may be vacuum formed to the pattern stations. A release agent, gelcoat material and mold making material may also be applied in alternative embodiments.

In another embodiment of the present invention, a method of making a mold includes the steps of determining the contours of the part to be produced from the mold, forming a cavity corresponding to the contours of the part to be produced from the mold, vacuum forming a plastic material in the cavity and applying a mold making material. The cavity may be formed by cutting the contours of the object at various locations in sheets of material and joining the sheets together. A release agent and/or gelcoat material may be applied.

Other aspects and novel features of the present invention will now be apparent to those skilled in the art from consideration of the detailed description of the preferred embodiments and accompanying drawings.

DETAILED DESCRIPTION OF THE PREFERRED EMBODIMENTS

Figure 1:
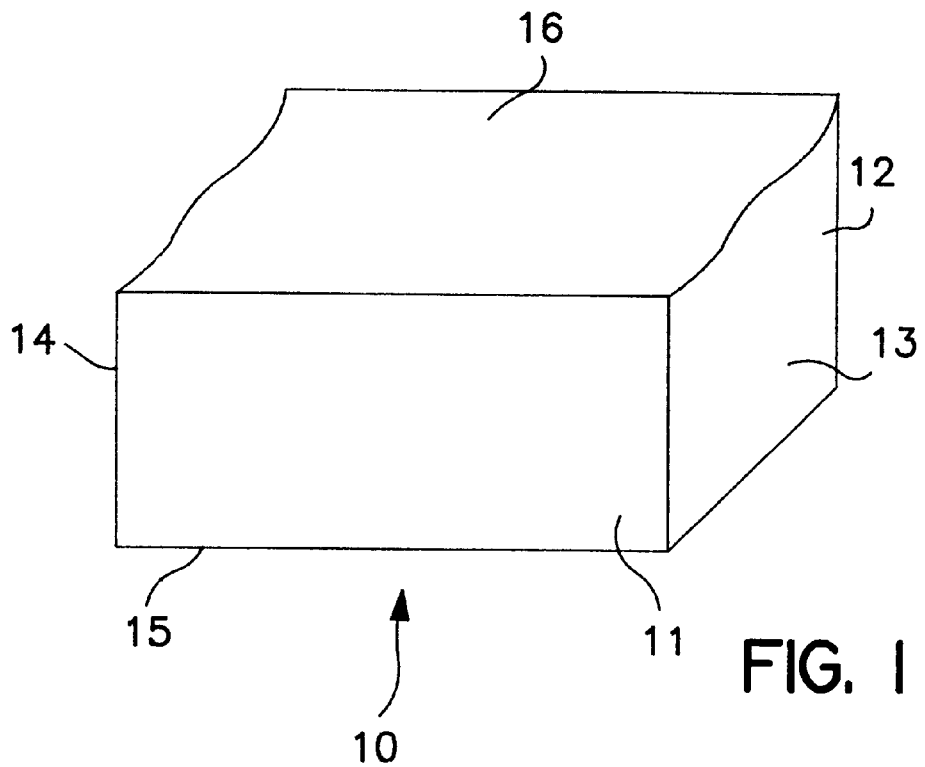
FIG. 1 is a perspective view of a pattern for making a mold according to the present invention.
Figure 2:
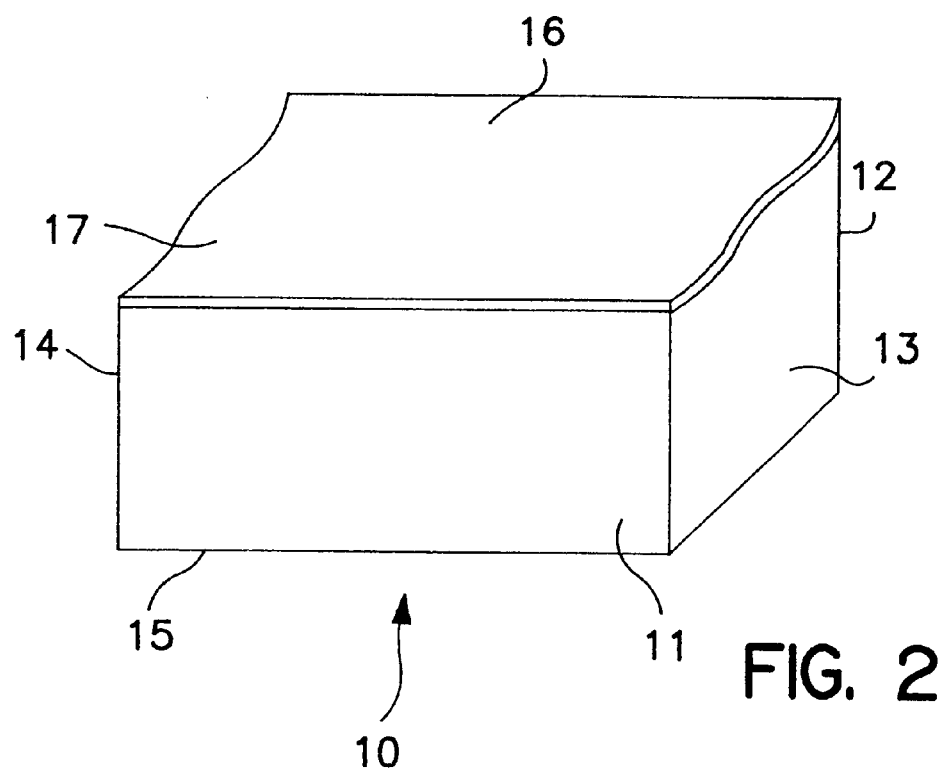
FIG. 2 is a perspective view of the pattern shown in FIG. 1 with a portion of the surface shaded to indicate the profile of the part to be manufactured from the mold.

FIG. 1 is a perspective view of a pattern from which a production mold may be made according to a method of the present invention. The pattern 10 includes a front surface 11, a rear surface 12, a first side surface 13, a second side surface 14, a bottom 15 and a top surface 16. The pattern will be used to make a mold for producing parts of a desired configuration. A portion of the pattern corresponds to the contours of the part to be produced. For example, the shaded surfaces of pattern 10 in FIG. 2 could represent, for example, the shape of a molded plastic panel for a portion of a recreational vehicle.

Figure 3:
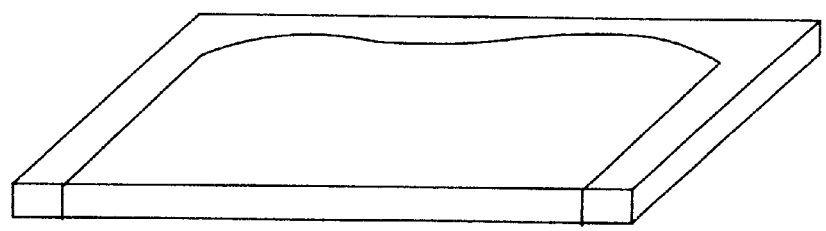
FIG. 3 is a perspective view of a sheet material with a station pattern cut therein.
Figure 5:
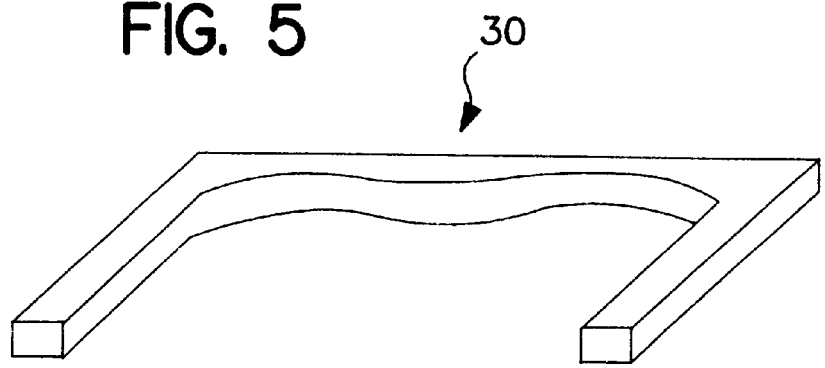
FIG. 5 is a perspective view of the female station pattern shown in FIG. 3.
Figure 4:
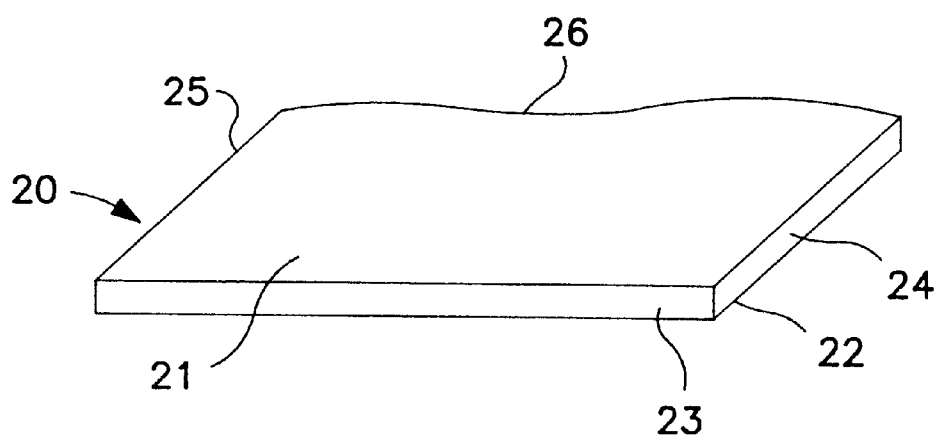
FIG. 4 is a perspective view of the station pattern shown in FIG. 3.

To produce the pattern 10, the shape of the part to be molded is first determined. This may be done by one of several methods. For example, the part may first be graphically generated in three dimensions by computer aided design. Once the. configuration of the part is determined, the CAD system can be used to isolate cross-sections of the part at any desired location so to determine the surface configuration of a cross-section of the part at that location. A CNC router is then used to cut out a pattern station having a surface corresponding to the surface contour off the part to be molded at the given cross-sectional location. For example, a piece of plywood or foam material may be cut as shown in FIG. 3 to produce a pattern station 20 as shown in FIG. 4. Note that this leaves a female pattern station 30 as shown in FIG. 5. Pattern station 20 includes a first surface 21, a second surface 22, a first edge 23, a second edge 24, a third edge 25 and a fourth edge 26.

Once a number of pattern stations have been cut, they are placed in a frame 40 (FIG. 6) in spaced apart relationship such that edges 26 of the pattern stations 20 form a general outline of the contour of the pattern. The pattern stations may be joined together by inserting removable rods 60 through the pattern members as shown in the cut-away portion of FIG. 6. Alternatively, pattern stations 20 may be clamped together.

Figure 6:
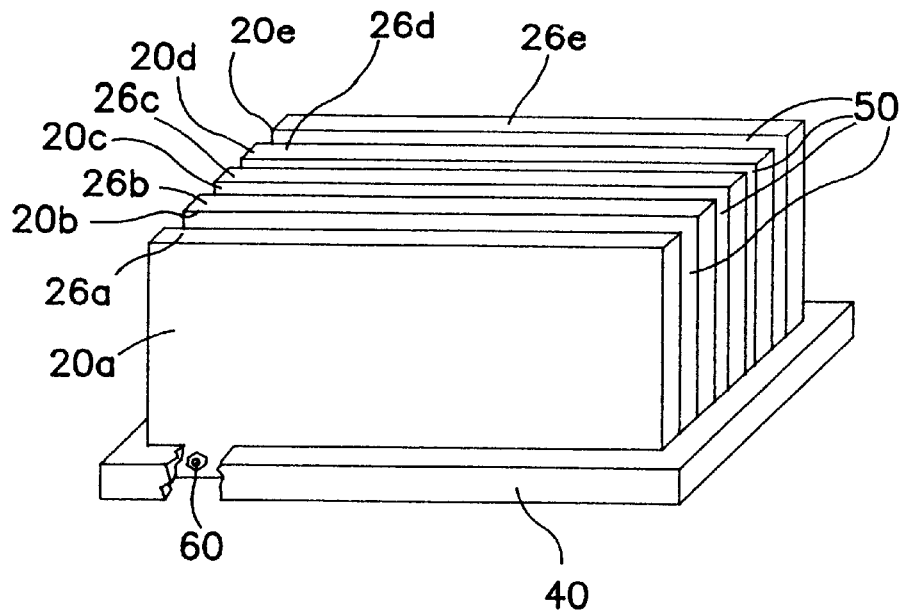
FIG. 6 is a perspective view of a step for forming a pattern for making a mold according to the present invention.
Figure 7:
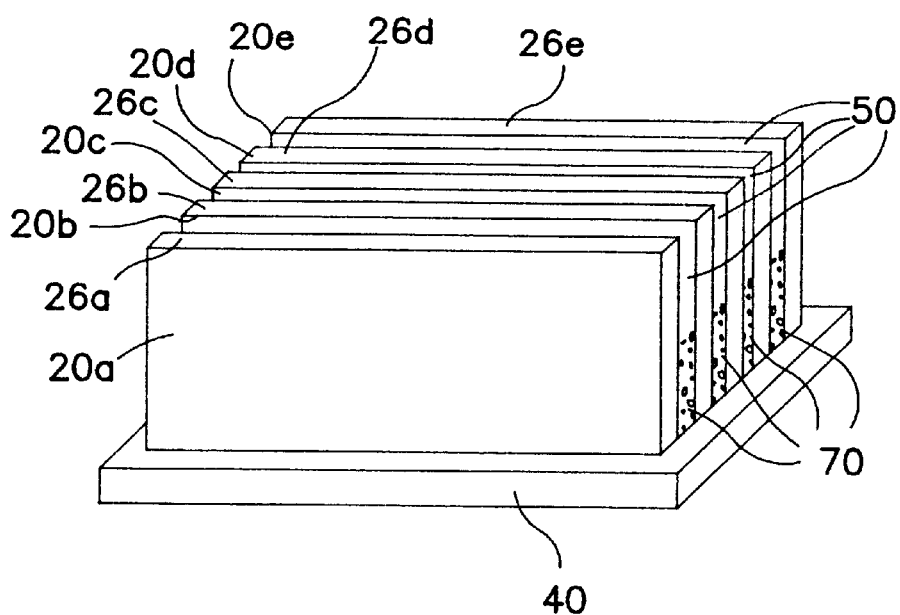
FIG. 7 is a perspective view of another step for forming a pattern for making a mold according to the present invention.
Figure 8:
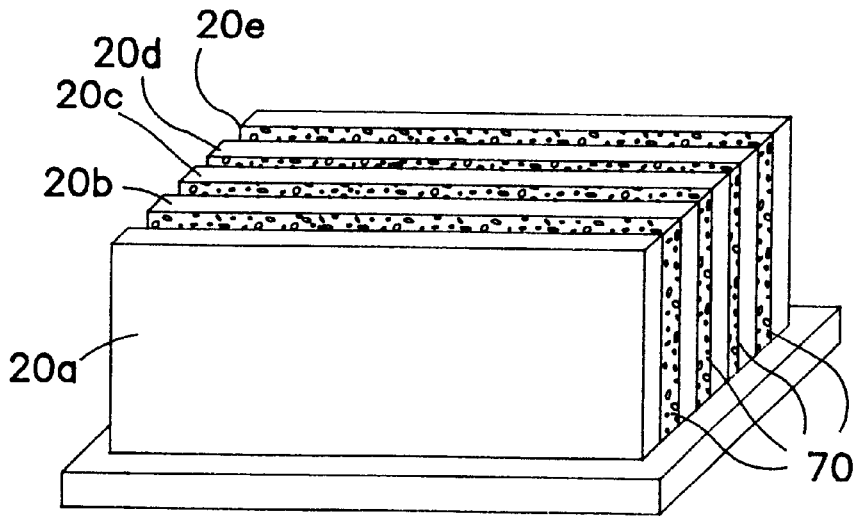
FIG. 8 is a perspective view of another step for forming a pattern for making a mold according to the method of the present invention.

Once the pattern stations have been positioned as shown in FIG. 6, a dual component liquid polyurethane foam 70 is injected into spaces 50. As the two components react, the foam rises within spaces 50 as shown in FIG. 7. Ultimately the foam rises to completely fill and spill out of spaces 50. The foam preferably has a density of six pounds. Spaces 50 may be partially filled with scraps of wood, foam or other material to form a base or floor before the liquid foam is injected into spaces 50. Next, the hardened foam is shaped by cutting, sanding or other methods to form the profile of the pattern, as shown in FIG. 8.

Next, plastic filler is used to fill any low spots creating during the shaping step and to add final detail to the shape. A thin layer of fiberglass reinforced plastic is then applied over the foam and pattern stations to seal the surface. This layer is then sanded, smoothed and coated with a layer of resinous gelcoat material. After the gelcoat hardens it is wet sanded to a mirror-like gloss finish using 1200 grit wet or dry sand paper. The polished gelcoat surface is then waxed. The pattern is now complete.

Figure 9:
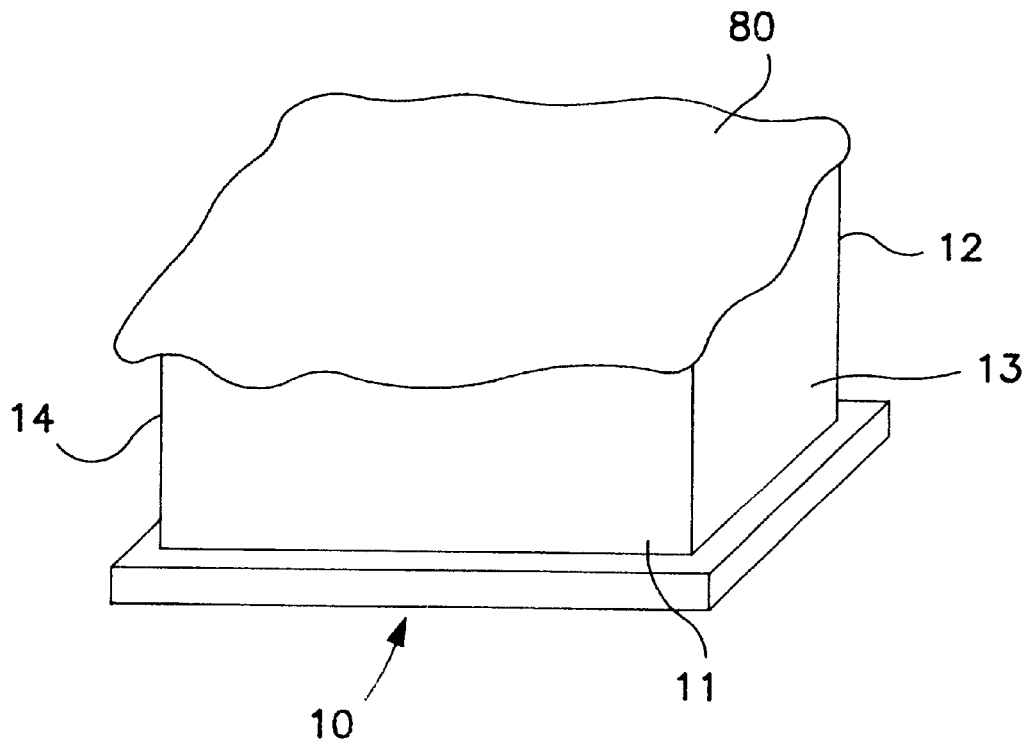
FIG. 9 is a perspective view of another step for forming a pattern for making a mold according to the method of the present invention.
Figure 10:
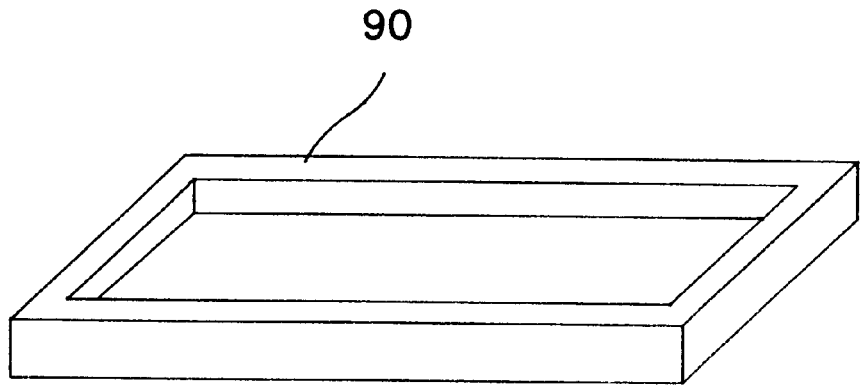
FIG. 10 is a perspective view of a mold produced according to the present invention.

To make a mold, the pattern is coated with a thermoset tooling surface coating reinforced with a thermoset fiberglass reinforced plastic 80 formulated for tool making. (FIG. 9) The mold 90 (FIG. 10) is then pulled from pattern 10.

Figure 11:
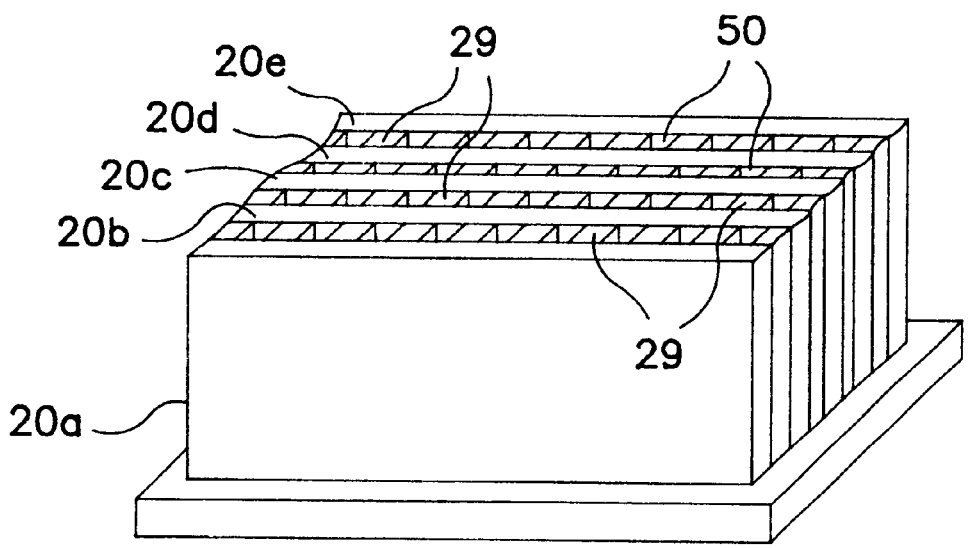
FIG. 11 is a perspective view of an alternative step to that shown in FIG. 6.

FIG. 11 shows an alternative step in a method for making a mold according to the present invention. In this step, additional pattern stations 29 are disposed between pattern stations 20. Pattern stations 29 are placed generally perpendicular to first surface 21 and second surface 22 of pattern stations 20. Openings 50 are then filled with foam 70 which is allowed to harden as described for the previous method. The same shaping and finishing steps are then performed.

Figure 12:
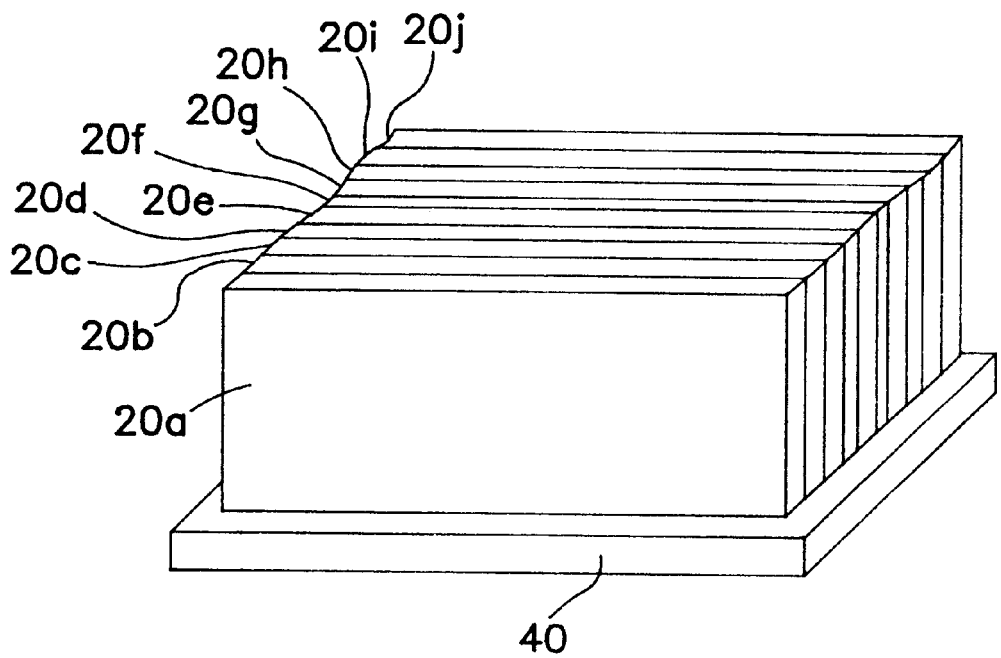
FIG. 12 is a perspective view of an alternative step to that shown in FIG. 6.

FIG. 12 shows another alternative step in producing the pattern used to make a mold by the method according to the present invention. In this step, pattern stations 20 constituting the entire profile of the part to be produced are cut from wood or foam sheets. They are then joined together such that surfaces 21 and 2 of adjacent stations abut each other. In this manner, little or no space exists between the stations. Any gaps are typically so small that they can be filled by simply applying a small amount of plastic filler over the surface. The pattern is then shaped, smoothed and waxed as described as above.

Note that utilizing the steps shown in FIG. 12 eliminates the foaming step shown in FIG. 7. It also allows a very early determination of what the pattern will look like. Because the stations are joined by removal rods or clamps, changes can be made by removing selected stations where the change is to be made and inserting different stations cut to the desired profile. This allows for relatively easy design changes to be made to the profile.

Figure 13:
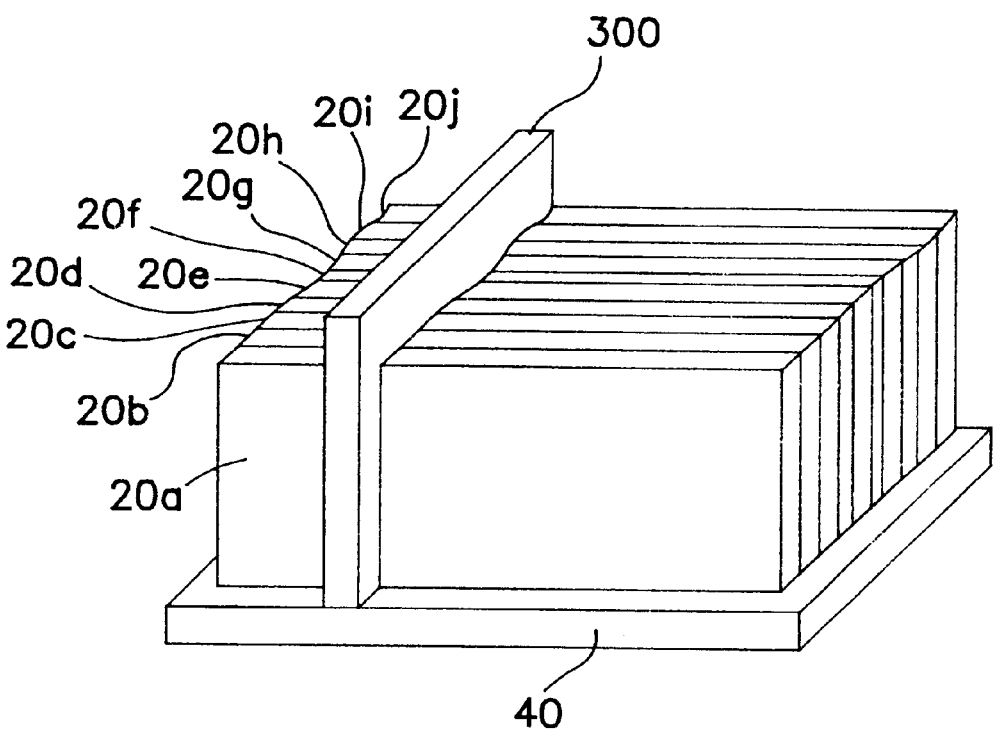
FIG. 13 is a perspective view of an optional step in a method according to the present invention.

FIG. 13 shows an additional optional step in a method according to the present invention. In this step, a select number of female pattern stations 300 are cut at a ninety degree angle to the male pattern stations. The female pattern stations are placed over the assembled male pattern stations to confirm that the male pattern stations are properly cut and positioned.

Figure 14:
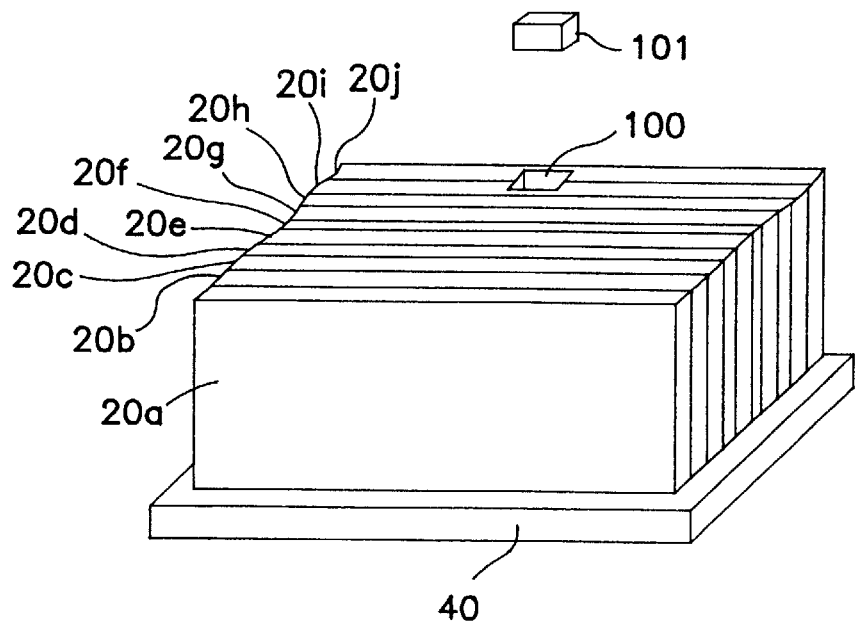
FIG. 14 is a perspective view of an additional step for forming a pattern for making a mold according to the present invention.

FIG. 14 shows another optional step for producing a mold by a method according to the present invention. In this step, a void 100 has been cut in the pattern stations. The void is designed to receive a separate component 101 that is configured to represent a more intricate detail of the part, such as a lighting fixture. Note that this step of the method could also be utilized in conjunction with the methods described previously. If so, the void would be created after the pattern is foamed and shaped as shown in FIG. 8.

Figure 15:
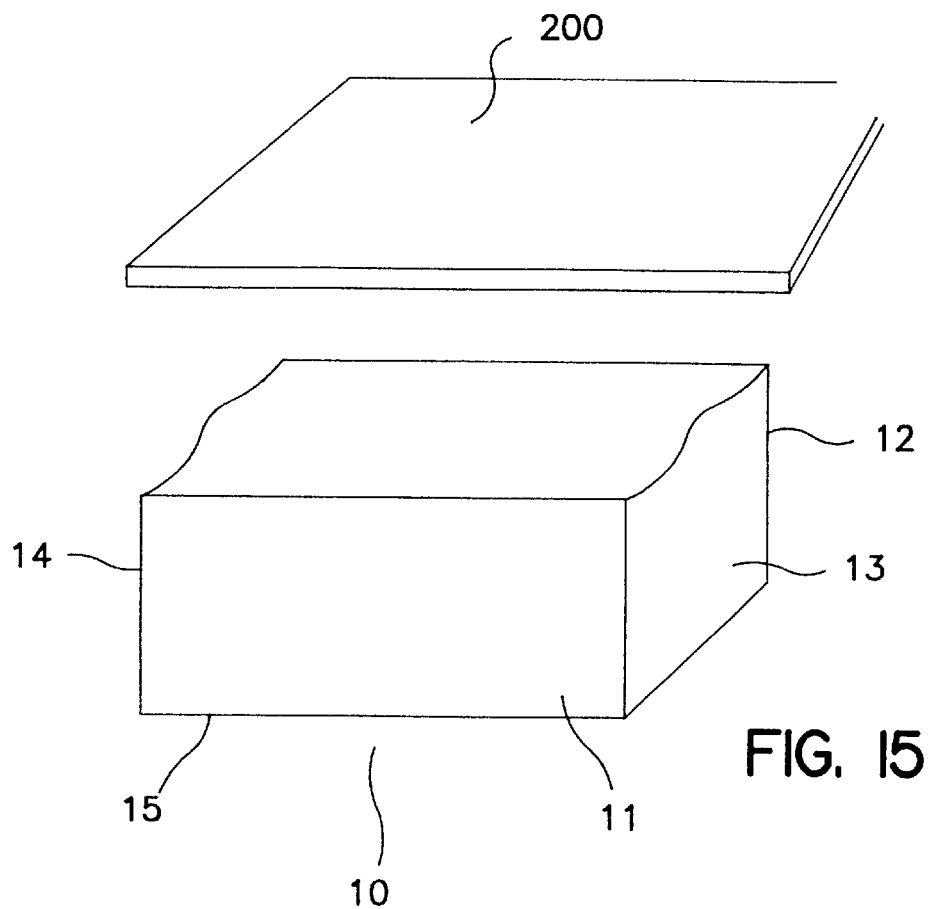
FIG. 15 is an alternative to the step shown in FIG. 9.

FIG. 15 shows another alternative step in a method according to the present invention. This step is an alternative to that shown in FIG. 9. In this step, after the male pattern stations are assembled a sheet of plastic material is placed over pattern 10 and vacuum formed to it. The plastic sheet can be any of a number of materials, including shrink wrap material. After vacuum forming, a release agent is applied to the plastic material, followed by a coating of tooling gel or epoxy material. A mold making material, such as a fiberglass reinforced plastic, is applied over the tooling gel or epoxy layer. When the mold making material hardens, it is pulled from the pattern, providing the mold.

Figure 16:
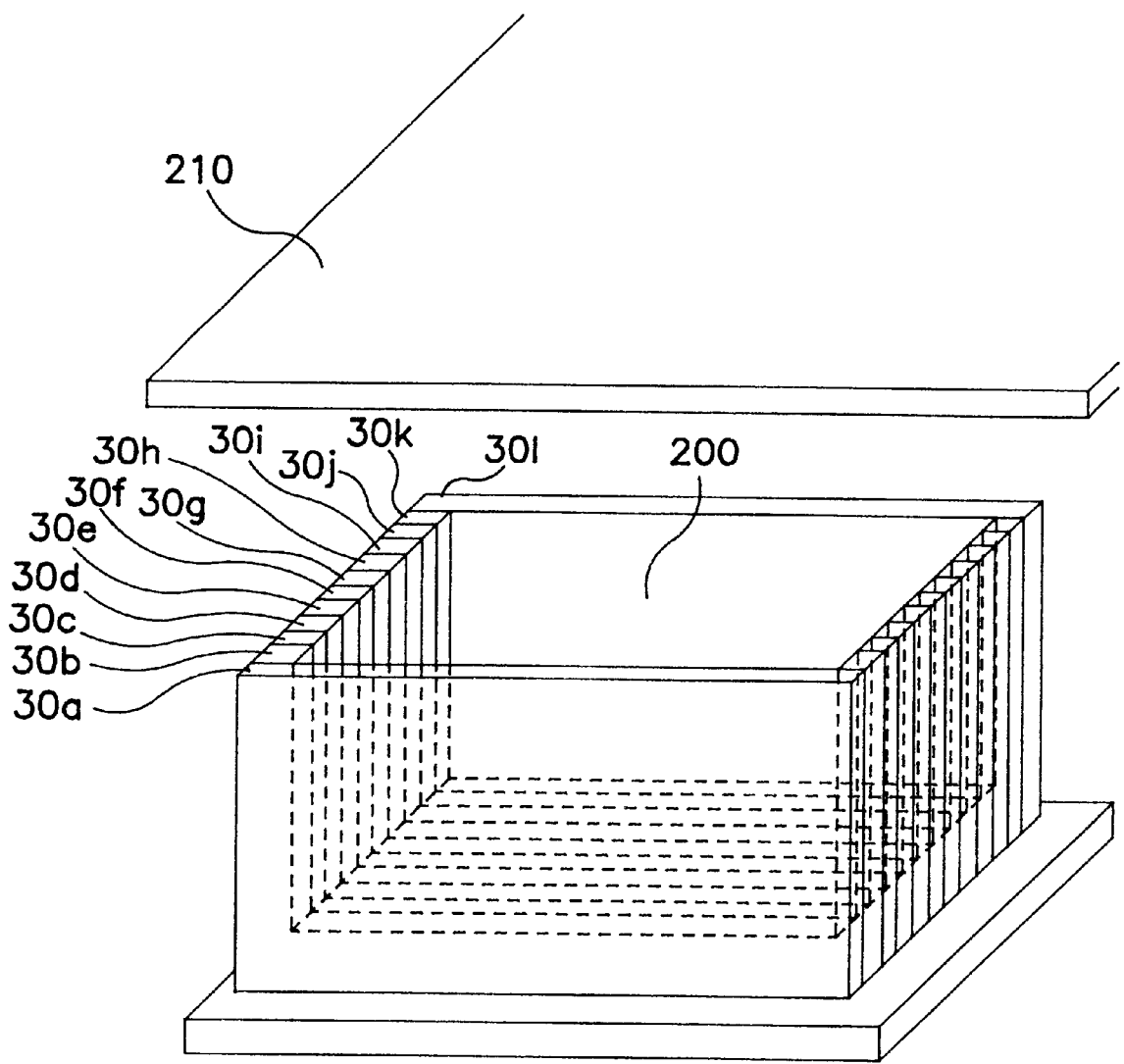
FIG. 16 shows an alternative method of making a mold according to the present invention.

FIG. 16 shows yet another embodiment of the method according to the present invention. In this embodiment, the female pattern stations 30 are joined together in the manner described above for the embodiment of FIG. 12 so as to form a cavity 200 corresponding to the ultimate shape of the mold. Plastic sheet 210 is placed over the cavity and vacuum formed to conform to the cavity. Plastic sheet 210 may be any one of a number of materials, including shrink wrap material. After vacuum forming, the plastic material is coated with a release agent, followed by a tooling gel or epoxy material. A mold making material, such as a fiberglass, reinforced plastic, is then applied. When the material hardens, it. is pulled from the cavity, resulting in a completed pattern. Mold making material is then applied to the pattern, allowed to harden, and pulled from the pattern to produce the mold.

Although the invention has been shown and described in detail, the same is by way of example only and not by way of limitation. Numerous changes may be made to the disclosed embodiments without departing from the scope of the invention. Accordingly, the spirit and scope of the invention are to be limited only by the claims appended hereto.

What is claimed is:

1. A method of making a mold comprising the steps of:
   determining the contours of a part to be produced from the mold;
   forming a plurality of pattern stations, each pattern station comprising a unitary structure having a first surface conforming at least in part to a contour of the part at a first location and a second surface lying in a different plane than the first surface, the second surface conforming at least in part to a contour of the part at a second location;

joining each unitary pattern station together such that adjacent pattern stations contact each other along substantially their entire length; and covering a portion of at least one of the pattern stations with a plastic material.

2. The method according to claim 1, wherein the pattern stations are releasibly joined together such that one or more pattern stations may be removed and substituted with one or more different pattern stations.

3. The method according to claim 1, wherein the pattern stations are joined together by a clamp.

4. The method according to claim 1, wherein the pattern stations are joined together by inserting a rod through openings in the pattern stations.

5. The method according to claim 1, wherein the pattern stations are joined together in a frame.

6. The method according to claim 1, wherein the plastic material is vacuum formed to the pattern stations.

7. The method according to claim 6, further comprising the step of applying a release agent to the vacuum formed plastic material.

8. The method according to claim 6, further comprising the step of applying a gelcoat material after vacuum forming the plastic material.

9. The method according to claim 8, further comprising the step of sanding the gelcoat material.

10. The method according to claim 8, further comprising the step of waxing the gelcoat material.

11. The method according to claim 6, further comprising the step of applying a mold making material after vacuum forming the plastic material.

12. The method according to claim 1, further comprising the step of placing at least one f emale pattern station over the pattern stations to test for proper alignment of the pattern stations.

* * * * *